United States Patent [19]

Hirsch

[11] 4,418,709
[45] Dec. 6, 1983

[54] UNLOADING VALVE FOR HI-LO-HYDRAULIC SYSTEM

[75] Inventor: Arthur E. Hirsch, Terre Haute, Ind.

[73] Assignee: J. I. Case Company, Racine, Wis.

[21] Appl. No.: 323,001

[22] Filed: Nov. 19, 1981

[51] Int. Cl.$^3$ .................. G05D 16/10; F16K 17/20
[52] U.S. Cl. ................................ 137/115; 137/491
[58] Field of Search ............ 137/115, 116, 491, 489, 137/495

[56] References Cited

U.S. PATENT DOCUMENTS 3,294,104 12/1966 Mercier .......................... 137/115

Primary Examiner—Martin P. Schwadron
Assistant Examiner—James R. Shay
Attorney, Agent, or Firm—Cullen, Sloman, Cantor, Grauer, Scott & Rutherford

[57] ABSTRACT

An unloading valve for satisfying the requirements of a hydraulic system while minimizing transient pressure fluctuations. When the hydraulic system requires full fluid flow, fluid under pressure passes through the valve for discharge to the hydraulic system. If the system does not require full fluid flow, the excess fluid is automatically discharged from the unloading valve to a reservoir. Incoming fluid under pressure is communicated against one end of a locking spool for causing it to operate against an unloading pin. An orifice plate is mounted within the valve body adjacent to the unloading pin with the opening through the orifice plate being closed by a spring biased unloading poppet. A relief poppet is provided in the valve body and incoming fluid under pressure into the interior of the relief poppet is communicated to a fluid chamber between the seated end of the unloading poppet and a mounting plug holding the unloading pin. The hydraulic system pressure increases until the unloading poppet opens slightly permitting fluid under pressure to escape as pilot flow to the reservoir. A further increase in fluid pressure in the system causes the relief poppet to unseat thereby permitting drainage flow to the reservoir. A point is reached where the system pressure shifts the locking spool against the unloading pin and unloading poppet until the unloading poppet is fully opened and the relief poppet is moved away from its seat to the limit of its travel. If the hydraulic system pressure drops, the locking spool is shifted back thereby reloading the valve until the pressure in the system again rises to the unload pressure. Thus, the unloading pin provides for substantially reduced oscillations in the operation of the unloading valve as compared to conventional ball-seat arrangements.

1 Claim, 1 Drawing Figure

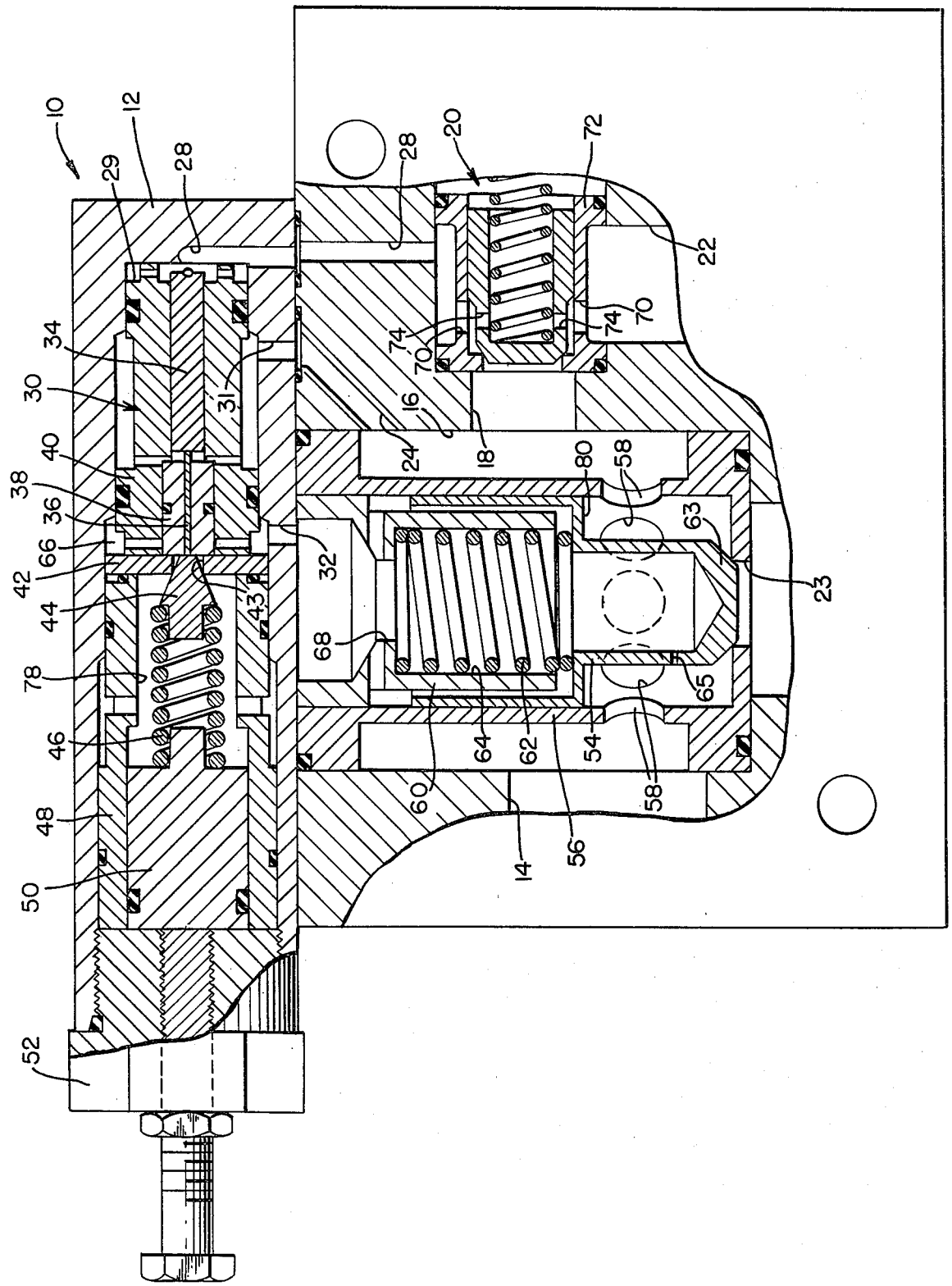

UNLOADING VALVE FOR HI-LO-HYDRAULIC SYSTEM

BACKGROUND OF INVENTION

The present invention relates to an improved unloading valve for satisfying the requirements of a hydraulic system while minimizing trasient pressure fluctuations.

It is common in earth-moving equipment, such as front-end loaders, backhoes or the like, to have a bucket or a shovel mounted on a tractor to be raised and lowered, tilted, or otherwise moved into the correct attitude by an appropriate mechanism for the work being performed at the moment. Such adjustments of the bucket or shovel are commonly made by hydraulic cylinders supplied with fluid pressure from a suitable pump.

A common mode of operation in earth-working is to move a bucket or shovel into a pile of material. The hydraulic systems for such earth-working applications require a high volume of fluid at low pressure to rapidly move the cylinder piston rods and, therefore, the bucket or shovel to the work. Then, low fluid volume under high pressure must be available to provide the necessary tilting of the bucket or shovel to break a portion of the material loose from the work pile or lift the material in the bucket or shovel.

One of the prior art approaches has been to provide two fixed displacement pumps to supply the required fluid under pressure with the excess being discharged through an unloading valve. This allows for high flow at low pressure and low flow at high pressure for rapidly moving the bucket to the work and then working the bucket against a load without requiring increased power from the engine.

A problem with known unloading valves that utilize a poppet instead of a spool for the control element is that there are substantial pressure fluctuations at the transition when the valve unloads. In a conventional unloading valve including a ball, seat and plunger spool in the pilot section of the valve, the ratio of the seating area of the ball within its seat to the cross-sectional area of the spool determines the unload to reload pressure ratio. The spool area is greater than the ball seat area for the valve to reset at the desired unloading pressure. This results in oscillations which are introduced between unload and reset pressures due to the difference in areas of the ball seat and plunger spool.

The oscillations within known unloading valves are amplified by the normally low negative gain characteristic associated with these valves. If system pressure and valve inlet pressure rise above the unloading valve setting, the plunger spool tends to push the ball open well beyond its steady state position thereby causing a high net force to act on the valve poppet which opens it quickly. The result is that the valve poppet will overshoot since it will continue opening during the time required for the ball to return towards its seat. This creates an effective low negative gain. Unless the valve dynamic response is carefully tailored to a particular application or the valve is heavily damped, oscillation between unload and reset pressures would result.

Thus, there has been a need for an improved unloading valve which requires no appreciable damping to be stable and which can be made to open quite rapidly thereby protecting against transient pressure fluctuations.

SUMMARY OF THE INVENTION

The unloading valve of the present invention includes a valve body having an inlet port connected to a fixed displacement pump for receiving the fluid output of the pump. When the hydraulic system requires full fluid flow, fluid under pressure passes through the valve body which causes a check valve to open thereby permitting fluid to be discharged from the unloading valve to the hydraulic system through a discharge port. If the hydraulic system does not require full fluid flow, the excess is discharged from the valve through a drainage port to a reservoir.

Incoming fluid under pressure is communicated against one end of a locking spool for causing it to operate against an unloading pin. An orifice plate is mounted within the valve body adjacent to the unloading pin with the opening through the orifice plate being closed by a spring biased unloading poppet. The unloading poppet is unseated when the pressure against it from the system exceeds the pressure against it from the spring. The unloading pin of the present invention provides for substantially reduced oscillations in the operation of the unloading valve as compared to conventional ball-seat arrangements.

A relief poppet is provided in the valve body which is spring biased toward a closed or seated position within the valve drainage port. Incoming fluid under pressure passes into the interior of the relief poppet and is communicated to a fluid chamber between the seated end of the unloading poppet and the mounting plug holding the unloading pin.

As fluid pressure in the hydraulic system rises, system pressure is communicated from the discharge port to the locking spool. Further, the fluid pressure inside the relief poppet is communicated to the interior of the orifice plate. At a pressure determined by its spring, the unloading poppet opens slightly permitting fluid under pressure to escape into the chamber enclosing the unloading poppet spring. This chamber is connected to a reservoir for draining the pilot flow entering it when the unloading poppet is opened. The fluid flow into the chamber also causes a reduction in the fluid pressure within the interior of the relief poppet.

The fluid pressure drop from the inlet port to the interior of the relief poppet increases as the pressure in the hydraulic system increases because the fluid pressure within the relief poppet is limited by the unloading poppet. Further, since inlet fluid pressure opens the check valve, the pressure drop across the check valve acts to hold the locking spool in a position which does not affect the operation of the unloading valve.

The pressure drop from the inlet to the interior of the relief poppet is also seen across the unloading pin. However, the diameter of the unloading pin is small compared to the diameter of the unloading poppet such that the force due to the pressure differential across the unloading pin is almost negligible. Thus, when there is fluid flow through the check valve, the unloading pin also does not affect the operation of the unloading poppet.

When fluid pressure in the hydraulic system reaches a certain point, the pressure of the fluid interiorly of the relief poppet is counteracted by the inlet pressure acting upon the relief poppet thereby lifting the poppet end from the drainage port and permitting some fluid drainage flow to reservoir. As the fluid pressure in the hydraulic system increases, more of the fluid entering the unloading valve is dumped to the reservoir at the unload setting of the valve.

If the fluid pressure in the hydraulic system continues to increase, a point is reached where all the fluid flow entering the valve is discharged through the drainage port to reservoir. A further increase in system pressure beyond this point results in fluid backflow through the check valve thereby causing it to close. Then, system fluid pressure acts upon the locking spool causing it to shift against the unloading pin and unloading poppet. This reduces the effective setting of the unloading valve by an amount proportional to the pressure difference across the locking spool. As the unloading valve setting decreases, the force exerted by the locking spool against the unloading pin increases until the unloading poppet is fully open and the relief poppet is moved away from its seat to the limit of its travel. Thereafter, all entering fluid flow is discharged to the reservoir at low pressure and the locking spool holds the unloading poppet open thereby keeping the unloading valve actuated.

If the hydraulic system pressure drops, the unloading valve spring eventually overcomes the system pressure acting on the locking spool thereby reloading the valve. When the unloading poppet closes, the locking spool is shifted and the relief poppet is forced towards its seat until the pressure in the valve again rises to the unload pressure.

Thus, the unloading valve of the present invention minimizes the oscillations which occur between unload and reset pressures. Further, the improved valve requires no appreciable damping to be stable. As a result, it can be made to open quite rapidly, protecting against transient pressure fluctuations.

Other advantages and meritorious features of the unloading valve of the present invention will be more full understood from the following description of the invention, the appended claims, and the drawing, a brief description which follows.

BRIEF DESCRIPTION OF DRAWING

The single FIGURE drawing is an illustration of the unloading valve of the present invention.

DETAILED DESCRIPTION OF THE INVENTION

A preferred embodiment of the unloading valve of the present invention is illustrated in the single FIGURE drawing.

The unloading valve 10 is intended for use in a "Hi-Lo" hydraulic system which provides high flow at low fluid pressure and low flow at high fluid pressure. In such a system, at least two fixed displacement pumps are connected to a control valve for the hydraulic system with the unloading valve 10 being connected in line between one of the pumps and the control valve. If the full volume of the one fixed displacement pump is not required during operation of the hydraulic system, the unloading valve 10 automatically discharges the excess fluid flow to a reservoir.

Unloading valve 10 includes a valve body 12 having an inlet port 14 connected to a fixed displacement pump (not shown) for receiving the fluid output of the pump. When the hydraulic system requires full fluid flow, fluid under pressure passes through relief chamber 16 and port 18 which causes check valve 20 to open thereby permitting fluid to be discharged from unloading valve 10 to the hydraulic system through port 22. If the hydraulic system does not require the full fluid flow, the excess fluid is discharged from unloading valve 10 through port 23 to a reservoir (not shown).

Incoming fluid under pressure in relief chamber 16 is communicated through fluid lines 24 and 28 to an enlarged annular end 29 of locking sleeve 30 and to other portions of sleeve 30 through fluid lines 31 and 32. Locking spool 34 is slidably mounted within sleeve 30 for movement in response to fluid pressure in line 28 against one of its ends. Unloading pin 36 is slidably mounted within plug 38 at the other enlarged annular end 40 of sleeve 30. Pin 36 is operated upon by the movement of spool 34 against one of its ends.

An orifice plate 42 is mounted within housing 12 with the opening 43 through orifice plate 42 being closed by unloading poppet 44. Spring 46 biases unloading poppet 44 towards a closed position within orifice opening 43 as illustrated. Unloading poppet 44 is unseated from orifice opening 43 when the system pressure against it exceeds the pressure from spring 46. The pressure exerted against poppet 44 by spring 46 may be varied by changing the position of adjusting spool 50 within pressure sleeve 48 by means of adjusting spool 52.

Relief poppet 54 is mounted for movement within a sleeve 56 having peripheral openings 58. Spring 62, which is mounted in sleeve 60, biases relief poppet 54 towards a closed position where its end 63 is seated within outlet port opening 23. Incoming fluid under pressure through port 14 passes through sleeve openings 58 and into the interior 64 of relief poppet 54 through orifice 65. The fluid filling poppet interior 64 is communicated by orifice 68 and line 32 to the fluid chamber 66 between annular sleeve end 40 and orifice plate 42. Plug 38 has recesses (not shown) on its end closest to orifice plate 42 for permitting fluid communication between chamber 66 and the seated end of unloading poppet 44.

As fluid pressure in the hydraulic system rises, system pressure is communicated from port 22 through openings 70 in check valve sleeve 72, openings 74 in check valve 20, and line 28 to locking spool 34. Unloading valve inlet pressure is communicated to the opposite end of locking spool 34 through line 24 and opening 31. Further, the fluid pressure inside relief poppet 54 is communicated to the interior of orifice plate 42 through line 32. At a pressure determined by the force of spring 46, unloading poppet 44 opens slightly permitting fluid under pressure to escape into the chamber 78 enclosing spring 46. Chamber 78 is connected to a reservoir by a line (not shown) for draining the pilot flow entering chamber 78 when unloading poppet 44 is opened. The fluid flow into chamber 78 causes a reduction in the fluid pressure within the interior 64 of relief poppet 54.

The fluid pressure drop from inlet port 14 to the interior 64 of relief poppet 54 increases as the pressure in the hydraulic system increases because the fluid pressure within relief poppet 54 is limited by unloading poppet 44. Further, since inlet fluid under pressure through port 14 opens check valve 20, the pressure drop across check valve 20 acts to hold locking spool 34 in the position shown in the drawing. Thus, with fluid flow through check valve 20, spool 34 does not affect the operation of unloading valve 10.

The pressure drop from inlet 14 to the interior 64 of relief poppet 54 is also seen across unloading pin 36. However, the diameter of pin 36 is small compared to the diameter of unloading poppet 44 such that the force due to the pressure differential across pin 36 is almost negligible. Thus, when there is fluid flow through check valve 20, pin 36 also does not affect the operation of unloading poppet 44.

When fluid pressure in the hydraulic system reaches a certain point, the pressure of the fluid interiorly of relief poppet 54 is counteracted by the inlet pressure acting upon the annular area 80 of relief poppet 54 thereby lifting poppet end 63 from opening 23 and permitting some fluid drainage flow to reservoir. Since this drainage flow reduces the fluid flow to the hydraulic system slightly, the fluid pressure in the hydraulic system is also reduced somewhat. Thus, fluid pressure in the hydraulic system is limited to the setting on unloading valve 10.

Valve 10 acts like a pilot-operated relief valve having smooth and stable operating characteristics. As the fluid pressure in the hydraulic system increases, more of the fluid entering unloading valve 10 is dumped to reservoir at the unload setting of the valve.

If the fluid pressure in the hydraulic system continues to increase, a point is reached where all the fluid flow entering through port 14 is discharged through port 23 to reservoir. A further increase in system pressure beyond this point results in fluid backflow through check valve 20 thereby causing it to close. Then, system fluid pressure in line 28 acts upon spool 34 causing it to shift against unloading pin 36 and unloading poppet 44. This reduces the effective setting of unloading valve 10 by an amount proportional to the pressure difference across spool 34. As the unloading valve setting decreases, the force exerted by spool 34 against pin 36 increases until unloading poppet 44 is fully open and relief poppet 54 is moved away from its seat to the limit of its travel. Thereafter, all entering fluid flow is discharged to reservoir at low pressure and spool 34 holds poppet 44 open thereby keeping unloading valve 10 actuated.

If the hydraulic system pressure drops, spring 46 eventually overcomes or counteracts the system pressure acting on spool 34 thereby reloading valve 10. The reloading pressure is determined by the spring force of spring 46 and the diameter of spool 34. When poppet 44 closes, spool 34 is shifted back to the position shown in the drawing and poppet 54 is forced towards its seat until the pressure in chamber 66 again rises to the unload pressure. At this point, poppet 44 opens slightly thereby holding poppet 54 partially opened as previously described.

It will be apparent to those skilled in the art that the foregoing disclosure is exemplary in nature rather than limiting, the invention being limited only by the appended claims.

I claim:

1. An unloading valve for satisfying the requirements of a hydraulic system while minimizing transient pressure fluctuations, the unloading valve including a valve body having an inlet port connected to a pump for receiving the fluid output of the pump, an intermediate relief chamber within said valve body connected to said inlet port, and check valve means for permitting the full fluid flow from said pump to pass through a discharge port in said valve body to said hydraulic system;

a locking spool slidably mounted within a sleeve in said valve body, fluid pressure from said hydraulic system being communicated into a first fluid chamber adjacent one end of said locking spool within said valve body for causing it to operate against an unloading pin, said unloading pin mounted within a mounting plug, an orifice plate mounted in the valve body adjacent to the unloading pin with an opening through the orifice plate being closed by a spring biased unloading poppet having an end seated within said opening, the cross-sectional area of said unloading pin being uniform and relatively small compared to the cross-sectional area of said unloading poppet, and fluid pressure from said intermediate relief chamber being communicated into a second fluid chamber adjacent the opposite end of said locking spool for holding said locking spool in a first position until the hydraulic system pressure reaches a predetermined unload pressure value;

a relief poppet mounted within said intermediate relief chamber of the valve body, said relief poppet being spring biased towards a seated position within a drainage port, fluid pressure being communicated between the interior of said relief poppet and a third fluid chamber between said mounting plug and said seated end of said unloading poppet, said first, second and third fluid chambers being located on one side of said orifice plate and said unloading poppet being located on the opposite side of said orifice plate; and said unloading poppet being unseated when the pressure in the hydraulic system exceeds the spring force against the unloading poppet thereby permitting pilot flow to a reservoir, a further increasing system pressure resulting in the unseating of said relief poppet thereby permitting flow through said drainage port to said reservoir until all the fluid entering said inlet port being discharged to said reservoir, the hydraulic system pressure upon reaching said predetermined unload pressure value causing said locking spool to shift from said first position against said unloading pin and unloading poppet until said unloading poppet is fully opened and said relief poppet is moved away from its seat to the limit of its travel, and a reduction of system pressure below said predetermined unload pressure value resulting in the reloading of the valve and shifting of said locking spool back to its first position until the pressure in said system again rises to said unload pressure.

* * * * *